(12) United States Patent
Liu et al.

(10) Patent No.: US 9,944,123 B2
(45) Date of Patent: Apr. 17, 2018

(54) AXLE HOUSING ASSEMBLY FOR VEHICLE AND VEHICLE

(71) Applicant: BYD COMPANY LIMITED, Shenzhen (CN)

(72) Inventors: Huiyue Liu, Shenzhen (CA); Jia Wei, Shenzhen (CN); Chupeng Quan, Shenzhen (CN); Hui Chen, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 118 days.

(21) Appl. No.: 15/013,834

(22) Filed: Feb. 2, 2016

(65) Prior Publication Data

US 2016/0152074 A1 Jun. 2, 2016

Related U.S. Application Data

(63) Continuation of application No. PCT/CN2014/086033, filed on Sep. 5, 2014.

(30) Foreign Application Priority Data

Sep. 18, 2013 (CN) .......................... 2013 1 0431734

(51) Int. Cl.
*B60B 35/16* (2006.01)

(52) U.S. Cl.
CPC ....... *B60B 35/163* (2013.01); *B60B 2900/112* (2013.01); *B60B 2900/113* (2013.01);
(Continued)

(58) Field of Classification Search
CPC .............................. B60B 35/16; B60B 35/163
(Continued)

(56) References Cited

U.S. PATENT DOCUMENTS

| 4,768,808 A | 9/1988 | Derees |
| 5,308,095 A * | 5/1994 | Fabris ................... B60B 35/003 180/6.38 |

(Continued)

FOREIGN PATENT DOCUMENTS

| CN | 201280032 Y | 7/2009 |
| CN | 201520163 U | 7/2010 |

(Continued)

OTHER PUBLICATIONS

BYD Company Limited, International Search Report and Written Opinion, PCT/CN2014/086033, dated Dec. 2, 2014, 12 pgs.
(Continued)

*Primary Examiner* — James A English
(74) *Attorney, Agent, or Firm* — Morgan, Lewis & Bockius LLP

(57) ABSTRACT

An axle housing assembly for a vehicle is provided. The axle housing assembly for a vehicle includes a first axle housing, a second axle housing spaced apart from the first axle housing in a front-rear direction, an upper connector and a lower connector. The upper connector defines a front end connected to the first axle housing and a rear end connected to the second axle housing, and the lower connector is disposed below the upper connector and defines a front end connected the first axle housing and a rear end connected to the second axle housing. A vehicle including the axle housing assembly is also provided.

17 Claims, 4 Drawing Sheets

(52) U.S. Cl.
CPC ... *B60B 2900/115* (2013.01); *B60B 2900/116* (2013.01); *B60B 2900/531* (2013.01); *B60B 2900/541* (2013.01)

(58) Field of Classification Search
USPC .......................................................... 180/905
See application file for complete search history.

(56) References Cited

U.S. PATENT DOCUMENTS

| | | | |
|---|---|---|---|
| 5,464,243 A * | 11/1995 | Maiwald | B60B 35/1018 180/906 |
| 6,511,096 B1 * | 1/2003 | Kunert | B60G 7/02 280/124.109 |
| 6,758,535 B2 * | 7/2004 | Smith | B60B 35/003 180/209 |
| 7,481,441 B2 * | 1/2009 | Kirkham | B60B 35/08 280/93.512 |
| 7,763,825 B2 * | 7/2010 | Katae | B60B 35/08 180/437 |
| 8,025,313 B2 * | 9/2011 | Tanaka | B60G 3/202 180/311 |
| 9,085,329 B2 * | 7/2015 | Komiya | B62D 21/11 |
| 2003/0177859 A1 | 9/2003 | Bernard et al. | |
| 2008/0001379 A1 * | 1/2008 | Myers | B60B 35/007 280/124.156 |
| 2015/0061272 A1 * | 3/2015 | Watanabe | B62D 21/11 280/784 |

FOREIGN PATENT DOCUMENTS

| | | |
|---|---|---|
| CN | 102079219 A | 6/2011 |
| CN | 201856579 U | 6/2011 |
| CN | 202863040 U | 4/2013 |
| DE | 4114848 C2 | 11/1991 |
| EP | 1527935 A1 | 5/2005 |
| EP | 1872982 A2 | 1/2008 |
| JP | 2000016006 A | 1/2000 |

OTHER PUBLICATIONS

BYD Company Limited, Extended European Search Report, EP14845668.4, dated Jan. 23, 2017, 6 pgs.

* cited by examiner

AXLE HOUSING ASSEMBLY FOR VEHICLE AND VEHICLE

CROSS-REFERENCE TO RELATED APPLICATIONS

This application is a continuation of PCT application No. PCT/CN2014/086033 filed Sep. 5, 2014, which claims priority to, and benefits of Chinese Patent Application No. 201310431734.0, filed with the State Intellectual Property Office of China, on Sep. 18, 2013, the entire content of which applications is incorporated herein by reference.

FIELD

Exemplary embodiments of the present disclosure relate generally to a vehicle field, and more particularly to an axle housing assembly for a vehicle and a vehicle including the axle housing assembly.

BACKGROUND

An axle housing assembly in the related art generally includes a first axle housing and a second axle housing, and the first axle housing is directly connected to the second axle housing via a first flange of the first axle housing, a second flange of the second axle housing and a bolt. The cavity defined by the first axle housing and the second axle housing has a relative small volume and a receiving space, and therefore it is not convenient for mounting other parts in the cavity. Meanwhile, in order to enlarge the volume of the cavity, the sizes of the first axle housing and the second axle housing may be increased accordingly, which causes inconveniences for manufacturing moulds of the axle housings and transferring the axle housing assembly. Thus, the cost for the maintenance and the manufacturing of the axle housing assembly may be increased.

SUMMARY

Embodiments of the present disclosure seek to solve at least one of the above-identified problems.

According to one aspect of the present disclosure, an axle housing assembly for a vehicle is provided. The axle housing assembly for a vehicle according to embodiments of the present disclosure has a relative larger cavity therein, and the cavity is convenient for mounting other parts of the vehicle. In addition, the volume of the cavity may be increased without increasing the volumes of the first axle housing and the second axle housing.

According to some embodiments of the present disclosure, the axle housing assembly for a vehicle includes: a first axle housing; a second axle housing spaced apart from the first axle housing in a front-rear direction; an upper connector defining a front end connected to the first axle housing and a rear end connected to the second axle housing; and a lower connector disposed below the upper connector and defining a front end connected the first axle housing and a rear end connected to the second axle housing.

With the axle housing assembly according to embodiments of the present disclosure, the first axle housing and the second axle housing are spaced apart from each other in the front-rear direction (for example, the front-rear direction of the vehicle) and connected to each other via the upper connector and the lower connector. In this way, a cavity with a relative larger volume may be defined by the first and second axle housings, which cavity may provide enough space for receiving other parts (such as a driving motor with a large size and a large power) of the vehicle. In addition, a longitudinal rigidity of the axle housing assembly may be improved. Moreover, as the upper connector and the lower connector independently have a predetermined length, the size of the cavity may be changed by changing the length of the upper connector and/or the lower connector. Therefore, the volume of the cavity may be increased without increasing volumes of the first axle housing and the second axle housing. In addition, the axle housing assembly according to embodiments of the present disclosure has components each with a relative smaller size and is convenient to transfer and prepare, and the moulds for components of the axle housing assembly are easy to manufacture. If one of these components is damaged, only the one damaged component is required to be replaced, without replacing the whole axle housing assembly. Therefore, the axle housing assembly according to embodiments of the present disclosure is convenient to repair and has relative lower maintenance cost. Further, the axle housing assembly for a vehicle according to embodiments of the present disclosure has a relative larger cavity therein, which cavity is more convenient to receive other parts of the vehicle. In addition, the maintenance fee for the axle housing assembly is low, and the axle housing assembly has a simple structure and low manufacturing cost.

In addition, the axle housing assembly for a vehicle according to embodiments of the present disclosure has following features.

In some embodiments, the first axle housing and the second axle housing are substantially same in structure. Thus, the first axle housing and the second axle housing may be prepared by using a common mould. Then the manufacturing cost of the axle housing assembly may be decreased, the structure of the axle housing assembly is simple, and the axle housing assembly is easy to be manufactured.

In some embodiments, the axle housing assembly further includes a mounting base for a thrust bar. The mounting base is connected between the upper connector and the first axle housing. An end of the thrust bar is connected to the first axle housing via the mounting base, and the other end of the thrust bar is connected to a frame of the vehicle. Therefore, the driving force output by a driving bridge of the vehicle may be transferred to the frame, so as to drive the vehicle to move forward.

In some embodiments of the present disclosure, the mounting base includes a lower part connected to a central area of an upper surface of the first axle housing, and an upper part connected to the front end of the upper connector, in which the rear end of the upper connector is connected to a central area of an upper surface of the second axle housing. Therefore, the structure of the axle housing assembly may be more reasonable, and the force applied on the axle housing assembly may be more uniform.

In some embodiments of the present disclosure, the mounting base and the first axle housing are connected to each other via a screw.

In some embodiments of the present disclosure, the upper connector and the mounting base are connected to each other via a screw.

In some embodiments of the present disclosure, the upper connector and the second axle housing are connected to each other via a screw.

In some embodiments of the present disclosure, the lower connector and the first axle housing are connected to each other via a screw.

In some embodiments of the present disclosure, the lower connector and the second axle housing are connected to each other via a screw.

According to some embodiments of the present disclosure, a left mounting groove and a right mounting groove are disposed in an upper part of the mounting base, the left mounting groove is adapted to be connected to a left thrust bar of the vehicle, and the right mounting groove is adapted to be connected to a right thrust bar of the vehicle. Generally, the mounting position of the thrust bar is corresponding to the roll center of the driving bridge. With the left and right mounting grooves, the mounting position of the thrust bar may be lifted, and therefore the roll center of the driving bridge may be lifted accordingly. Thus, the roll stability of the vehicle may be improved.

In some embodiments of the present disclosure, each of the left mounting groove and the right mounting groove is V-shaped or U-shaped. Therefore, the mounting base may have a better universality, i.e. the mounting base may be used to mount various kinds of thrust bars.

According to some embodiments of the present disclosure, the lower connector is a platelike connector and disposed between the first axle housing and the second axle housing. Therefore, the material for making the lower connector may be saved. Further, it is more convenient to assemble the lower connector and the first axle housing, and to assemble the lower connector and the second axle housing.

In some embodiments of the present disclosure, the lower connector is disposed between a central area of a lower part of the first axle housing and a central area of a lower part of the second axle housing. Then the axle housing assembly may have a more reasonable structure, and the force applied on the axle housing assembly may be more uniform.

According to another aspect of embodiments of the present disclosure, a vehicle including the axle housing assembly is provided. The vehicle includes the axle housing assembly according to embodiments of the first aspect of the present disclosure.

According to embodiments of the present disclosure, the cavity of the axle housing assembly of the vehicle may have a relative large cavity therein, and the cavity is more convenient to receive other parts of the vehicle. In addition, the vehicle may have a low maintenance cost, a simple structure, and a low manufacturing cost.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
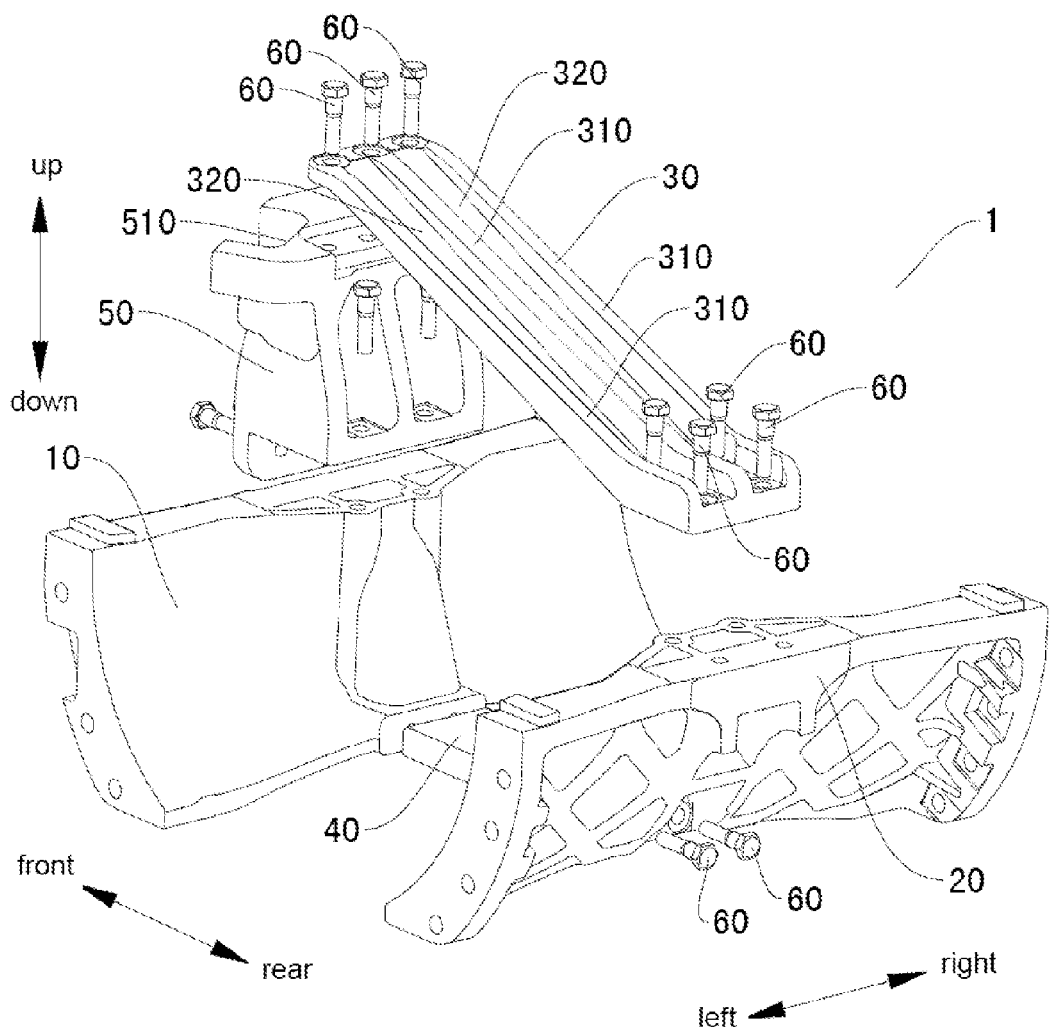
FIG. 1 is an explosive view of an axle housing assembly for a vehicle according to one embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It would be appreciated by those skilled in the related art that phraseology and terminology used herein with reference to device or element orientation (such as, terms like "longitudinal", "lateral", "up", "down", "front", "rear", "left", "right", "vertical", "horizontal", "top", "bottom", "inside", "outside") are only used to simplify description of the present disclosure, and do not indicate or imply that the device or element referred to must have or operated in a particular orientation. They cannot be seen as limits to the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the description, terms concerning attachments, coupling and the like, such as "connected" and "interconnected", refer to a relationship in which structures are secured or attached to one another through mechanical or electrical connection, or directly or indirectly through intervening structures, unless expressly described otherwise. Specific implications of the above phraseology and terminology may be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 2:
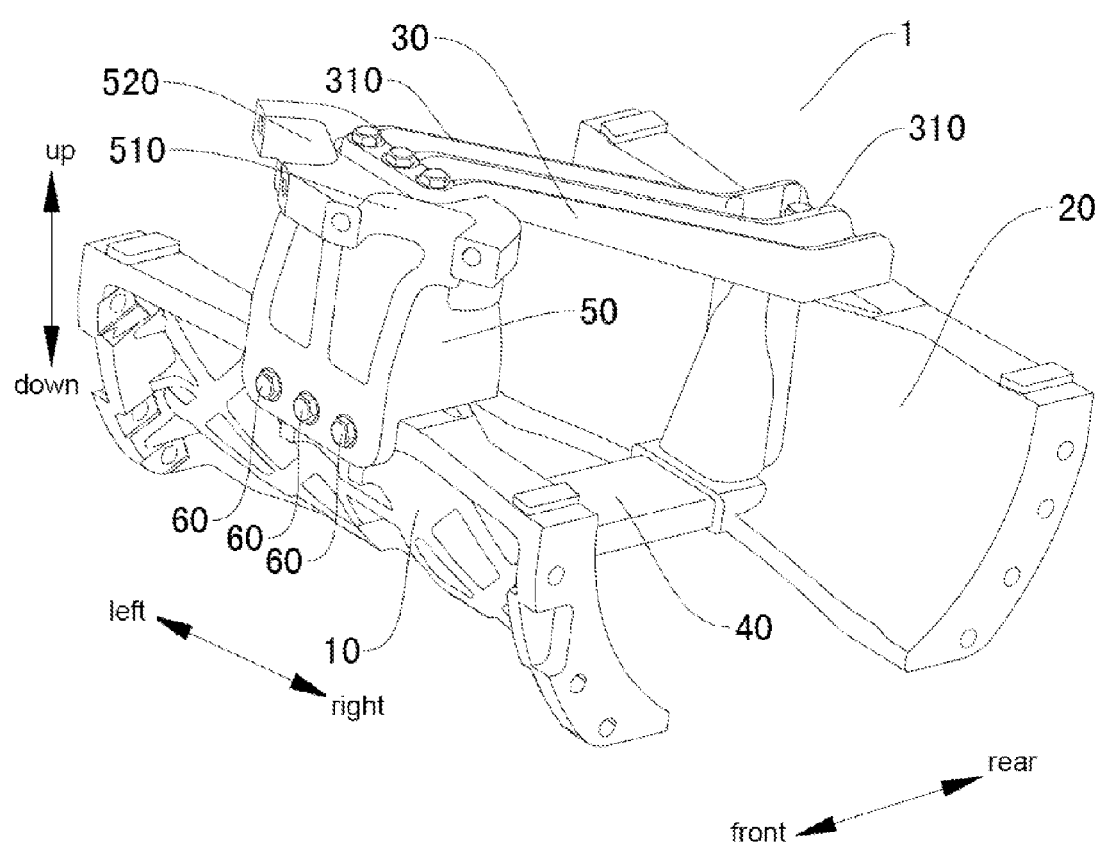
FIG. 2 is an axonometric view of an axle housing assembly for a vehicle according to one embodiment of the present disclosure.
Figure 3:
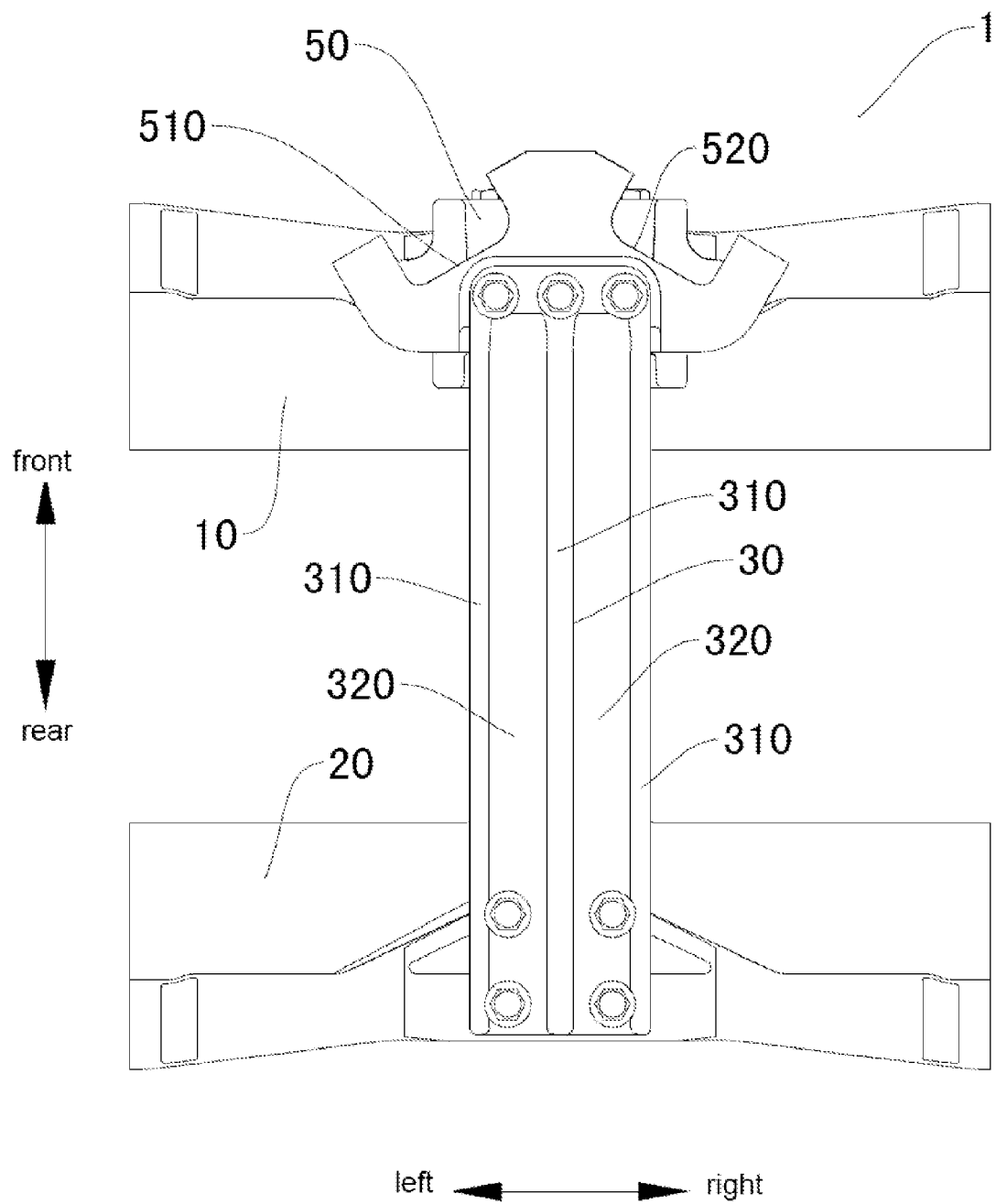
FIG. 3 is top view of an axle housing assembly for a vehicle according to one embodiment of the present disclosure.
Figure 4:
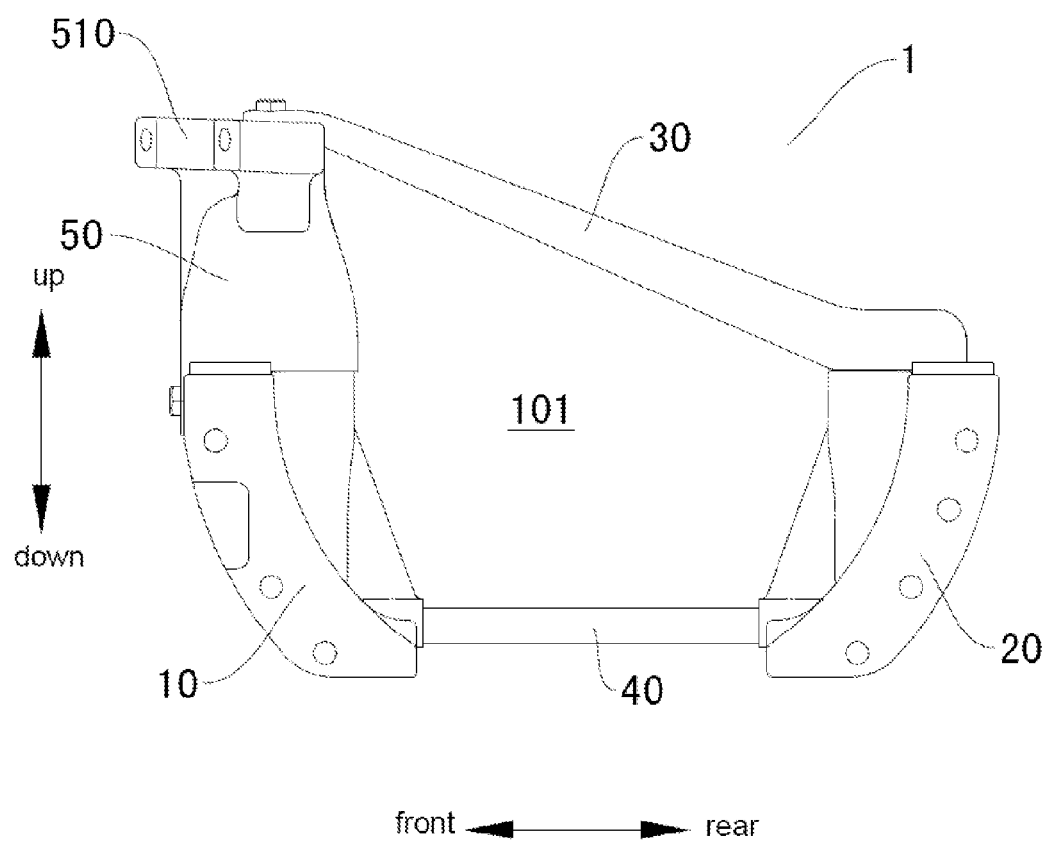
FIG. 4 is a side view of an axle housing assembly for a vehicle according to one embodiment of the present disclosure.

In the following, an axle housing assembly for a vehicle may be described in detail with reference to FIGS. 1-4.

As shown in FIGS. 1-4, the axle housing assembly 1 for a vehicle includes a first axle housing 10, a second axle housing 20, an upper connector 30 and a lower connector 40. The axle housing assembly 1 defines cavity 101 therein, and the cavity 101 is used to receive other components of the vehicle, for example, a differential, a main reducer, or a driving device such as a driving motor.

The first axle housing 10 and the second axle housing 20 are spaced apart from each other in a front-rear direction of the axle housing assembly 1. The front end of the upper connector 30 is connected to the first axle housing 10, and the rear end of the upper connector 30 is connected to the second axle housing 20. The front end of the lower connector 40 is connected the first axle housing 10, and the rear end of the lower connector 40 is connected to the second axle housing 20. The lower connector 40 is disposed below the upper connector 30.

According to one embodiment of the present disclosure, the vehicle may be an electric bus, the axle housing assembly 1 is disposed on a driving bridge of the electric bus, and the cavity 101 is used for receiving a driving motor of the electric bus. The driving bridge may carry other components of the vehicle together with the driven bridge. When the vehicle is running, various kinds of force such as a counter-force, an acting force and a torque transmitted by a driving wheel of the vehicle may be transferred to a frame of the vehicle via a suspension.

In other words, the first axle housing 10 is spaced apart from the second axle housing 20 by a certain distance in the front-rear direction. The upper part of the first axle housing 10 is connected to the upper part of the second axle housing 20 via the upper connector 30, the lower part of the first axle housing 10 is connected to the lower part of the second axle housing 20 via the lower connector 40. Therefore, the cavity 101 is defined by the first axle housing 10, the second axle housing 20, the upper connector 30 and the lower connector 40.

With the axle housing assembly according to embodiments of the present disclosure, the first axle housing and the second axle housing are spaced apart from each other in the front-rear direction and connected to each other via the upper connector and the lower connector. In this way, the cavity with a relative larger volume may be defined by the first and second axle housings, which cavity may provide enough space for receiving other parts (such as a driving motor with a large size and a large power) of the vehicle. In addition, a longitudinal rigidity of the axle housing assembly may be improved. Moreover, as the upper connector and the lower connector independently have a predetermined length, the size of the cavity may be changed by changing the length of the upper connector and/or the lower connector. Therefore, the volume of the cavity may be increased without increasing volumes of the first axle housing and the second axle housing. In addition, the axle housing assembly according to embodiments of the present disclosure has components each with a relative smaller size and is convenient to transfer and prepare, and the moulds for components of the axle housing assembly are easy to manufacture. If one of these components is damaged, only the one damaged component is required to be replaced, without replacing the whole axle housing assembly. Therefore, the axle housing assembly according to embodiments of the present disclosure is convenient to repair and has relative lower maintenance cost. Further, the axle housing assembly for a vehicle according to embodiments of the present disclosure has a relative larger cavity therein, which cavity is more convenient to receive other parts of the vehicle. In addition, the maintenance fee for the axle housing assembly is low, and the axle housing assembly has a simple structure and low manufacturing cost.

In addition, as shown in FIGS. 1-4, the first axle housing 10 and the second axle housing 20 may be substantially same in structure, i.e. have a substantial same structure. Thus, the first axle housing 10 and the second axle housing 20 may be prepared by using a common mould. In this way, the manufacturing cost of the axle housing assembly is decreased, the axle housing assembly may be easy to manufacture and has a simple structure.

It should be noted that, the structures of the first axle housing 10 and the second axle housing 20 may have very small differences. In one embodiment, the number of apertures in the first axle housing 10 is one more than that of the second axle housing 20. In the present embodiment, if the first axle housing 10 is prepared firstly using a mould, then a punching protrusion corresponding the extra aperture in the first axle housing 10 is removed, and then the second axle housing 20 may be prepared by using this mould. Accordingly, if the second axle housing 20 is prepared firstly using a mould, then a punching position corresponding the extra aperture in the first axle housing 10 is mounted with a pouching protrusion, and then the first axle housing 10 may be prepared by using this mould.

As shown in FIGS. 1-4, the axle housing assembly 1 further includes a mounting base 50 for a thrust bar of the vehicle, and the mounting base 50 is connected between the upper connector 30 and the first axle housing 10. The mounting base 50 is used for installing the thrust bar (not shown) of the vehicle, and the thrust bar is adapted to be connected to the frame of the vehicle. An end of the thrust bar is connected to the first axle housing 10 via the mounting base 50, and the other end of the thrust bar is connected to the frame of the vehicle. Therefore, the driving force output by the driving bridge of the vehicle may be transferred to the frame, so as to drive the vehicle to move forward.

In some embodiments of the present disclosure, the lower part of the mounting base 50 is connected to the central area of the upper surface of the first axle housing 10, the upper part of the mounting base 50 is connected to the front end of the upper connector 30, and the rear end of the upper connector 30 is connected to the central area of the upper surface of the second axle housing 20. Then the axle housing assembly 1 may have more reasonable structure and the force applied on the axle housing assembly 1 may be more uniform.

In one embodiment of the present disclosure, as shown in FIGS. 1-4, a left mounting groove 510 and a right mounting groove 520 are disposed in the upper part of the mounting base 50. The left mounting groove 510 is adapted to be connected to a left thrust bar of the vehicle, and the right mounting groove 520 is adapted to be connected to a right thrust bar of the vehicle. With the left and right mounting grooves 510, 520 disposed in the upper part of the mounting base 50, a roll center of the vehicle may be lifted. In other words, the distance between the roll center and the center of gravity of the vehicle may be reduced, and therefore a roll stability of the vehicle is improved. Specifically, the mounting position of the thrust bar is generally corresponding to the roll center of the driving bridge. With the left and right mounting grooves, the mounting position of the thrust bar may be lifted, and therefore the roll center of the driving bridge may be lifted accordingly. Thus, the roll stability of the vehicle may be improved.

In some embodiments, the vehicle includes a V-shaped thrust bar having a left thrust bar and a right thrust bar. In a specific embodiment of the present disclosure, an end of the left thrust bar of the V-shaped thrust bar is installed in the left mounting groove 510 of the mounting base 50, and the other end of the left thrust bar of the V-shaped thrust bar is connected to the frame of the vehicle. An end of the right thrust bar of the V-shaped thrust bar is installed in the right mounting groove 520 of the mounting base 50, and the other end of the right thrust bar of the V-shaped thrust bar is connected to the frame of the vehicle. Therefore, the V-shaped thrust bar, the axle housing assembly 1 and the frame of the vehicle are connected together, which may avoid the displacement of the vehicle in the front-rear/left-right direction of the vehicle. The structure, installation and function of the V-shaped thrust bar are well known to those having ordinary skill in the art, thus details related are omitted herein.

In some embodiments of the present disclosure, each of the left and right mounting grooves 510, 520 is V-shaped or U-shaped, i.e., the left mounting groove 510 may have a V shaped or U shaped, and the right mounting groove 520 may have a V shape or a U shaped. Therefore, the mounting base may have a good universality, for example, various kinds of other components, such as thrust bar with different sizes and shapes, may be conveniently mounted on the mounting base 50.

In one embodiment of the present disclosure, the lower connector 40 is a platelike connector, and the lower connector 40 is disposed between the first axle housing 10 and the second axle housing 20. In the other words, the frond end of the lower connector 40 is connected to one side of the first axle housing 10 facing the cavity 101, and the rear end of the lower connector 40 is connected to one side of the second axle housing 20 facing the cavity 101. Therefore, the material for making the lower connector 40 is saved, and the assembling between the lower connector 40 and the first axle housing 10 and between the lower connector 40 and the second axle housing 20 are more convenient. Specifically, the lower connector 40 is disposed between the first and second axle housings 10, 20. In other words, the front end of the lower connector 40 does not extend beyond the front surface of the first axle housing 10, the rear end of the lower connector 40 does not extend beyond the rear surface of the second axle housing 20. In this way, the length of the lower connector 40 may be reduced, and the material for manufacturing the lower connector 40 may be saved. In addition, the lower connector 40 may be installed in the left-right direction instead of the up-down direction of the axle housing assembly 1, thereby facilitating the installing process.

In one embodiment of the present disclosure, the lower connector 40 is connected to the first axle housing 10 via a screw, and the upper connector 30 is connected to the second axle housing 20 via a screw. Specially, a first threaded hole may be formed in the front end of the lower connector 40, a first bolt hole corresponding to the first threaded hole may be formed in the lower part of the first axle housing 10, and the lower connector 40 is connected to the first axle housing 10 by a bolt 60 which extends into the first threaded hole through the first bolt hole. Similarly, a second threaded hole may be formed in the rear end of the upper connector 30, a second bolt hole corresponding to the second threaded hole may be formed in the lower part of the second axle housing 20, and the upper connector 30 is connected to the second axle housing 20 by a bolt which extends into the second threaded hole through the second bolt hole. In some embodiments, the lower connector 40 includes a plurality of the first threaded holes, the first axle housing 10 includes a plurality of the first bolt holes, the upper connector 30 includes a plurality of the second threaded holes, and the second axle housing 20 includes a plurality of the second bolt holes. The first threaded holes are in one-to-one correspondence to the first bolt holes, and the second threaded holes are in one-to-one correspondence to the second bolt holes. In this way, the connection between the lower connector 40 and the first axle housing 10 as well as the connection between the lower connector 40 and the second axle housing 20 are more stable.

In some embodiments of the present disclosure, the lower connector 40 is disposed between the central area of the lower part of the first axle housing 10 and the central area of the lower part of the second axle housing 20. Then the axle housing assembly may have a more reasonable structure, and the force applied on the axle housing assembly 1 may be more uniform.

As shown in FIGS. 1-4, the lower part of the mounting base 50 may be connected to the central area of the upper surface of the first axle housing 10, the upper part of the mounting base 50 may be connected to the front end of the upper connector 30, and the rear end of the upper connector 30 may be connected to the central area of the upper surface of the second axle housing 20. Meanwhile, the lower connector 40 is disposed between the central area of the lower part of the first axle housing 10 and the central area of the lower part of the second axle housing 20.

That is to say, the first axle housing 10, the second axle housing 20, the upper connector 30, the lower connector 40 and the mounting base 50 may independently be symmetric about a longitudinal midline of the vehicle. A longitudinal direction of the vehicle relates to a length direction of the vehicle, and the longitudinal midline is parallel to the length direction of the vehicle and has an equal distance to left and right sides of the vehicle in a lateral direction (width direction) of the vehicle. In a word, the vehicle may be symmetric about the longitudinal midline in the left-right direction (width direction) of the vehicle. Therefore, the axle housing assembly 1 may have an optimized structure, which optimizes stresses applied thereon.

In some embodiments, the mounting base 50 may be connected to the first axle housing 10 via a screw, the mounting base 50 may be connected to the upper connector 30 via a screw, the upper connector 30 may be connected to the second axle housing 20 via a screw, the lower connector 40 may be connected to the first axle housing 10 via a screw, and the lower connector 40 may be connected to the second axle housing 20 via a screw. Therefore, the installation of the axle housing assembly may be more convenient, and the efficiency for assembling the axle housing assembly may be higher.

In one embodiment of the present disclosure, the upper connector 30 may be platelike. A plurality of protruded ribs 310 extending along a front-rear direction of the upper connector 30 may be formed on the upper surface of the upper connector 30. The protruded ribs 310 may be parallel to one another in the left-right direction of the upper connector 30, thus defining at least one groove 320 each formed between two adjacent protruded ribs 310.

A first bolt hole may be formed in the upper surface of the front end of the upper connector 30, which penetrates the upper connector 30 in the thickness direction of the upper connector 30. Accordingly, a first threaded hole corresponding to the first bolt hole is formed in the upper part of the mounting base 50. A bolt 60 may extend into the first threaded hole through the first bolt hole to connect the upper connector 30 and the mounting base 50.

A second bolt hole may be formed in the bottom surface of the groove 320 in the rear end of the upper connector 30, which penetrates the upper connector 30 in the thickness direction of the upper connector 30. Accordingly, a second threaded hole corresponding to the second bolt hole is formed in the upper part of the second axle housing 20. A bolt 60 may extend into the second threaded hole through the second bolt hole to connect the upper connector 30 and the second axle housing 20.

In some embodiments, the mounting base 50 includes a plurality of the first threaded holes, the upper connector 30 includes a plurality of the first bolt holes, the second axle housing 20 includes a plurality of the second threaded holes, and the upper connector 30 includes a plurality of the second bolt holes. The first threaded holes are in one-to-one correspondence to the first bolt holes, and the second threaded holes are in one-to-one correspondence to the second bolt holes. In this way, the connection between the upper connector 30 and the mounting base 50 may be more stable, and the connection between the upper connector 30 and the second axle housing 20 may be more stable.

According to another aspect of embodiments of the present disclosure, a vehicle including the above-identified axle housing assembly for a vehicle is provided. The vehicle includes the above-identified axle housing assembly which defines a relative larger cavity 101 therein for receiving other components of the vehicle. Therefore, the vehicle according to embodiments of the present disclosure is convenient to assemble, the cost for the maintenance of the vehicle is low, the structure of the vehicle is simple, and the cost for manufacturing the vehicle is low.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An axle housing assembly for a vehicle, comprising:
   a first axle housing;
   a second axle housing spaced apart from the first axle housing in a front-rear direction;
   an upper connector defining a front end connected to the first axle housing and a rear end connected to the second axle housing;
   a lower connector disposed below the upper connector and defining a front end connected the first axle housing and a rear end connected to the second axle housing; and
   a mounting base connected between the upper connector and the first axle housing,
   wherein the mounting base comprises a lower part connected to a central area of an upper surface of the first axle housing, and an upper part connected to the front end of the upper connector, wherein the rear end of the upper connector is connected to a central area of an upper surface of the second axle housing.

2. The axle housing assembly according to claim 1, wherein the first axle housing and the second axle housing are substantially same in structure.

3. The axle housing assembly according to claim 1, wherein the mounting base and the first axle housing are connected to each other via a screw.

4. The axle housing assembly according to claim 1, wherein the upper connector and the mounting base are connected to each other via a screw.

5. The axle housing assembly according to claim 1, wherein a left mounting groove and a right mounting groove are disposed in an upper part of the mounting base.

6. The axle housing assembly according to claim 5, wherein each of the left mounting groove and the right mounting groove is V-shaped or U-shaped.

7. The axle housing assembly according to claim 1, wherein the upper connector and the second axle housing are connected to each other via a screw.

8. The axle housing assembly according to claim 1, wherein the lower connector and the first axle housing are connected to each other via a screw.

9. The axle housing assembly according to claim 1, wherein the lower connector and the second axle housing are connected to each other via a screw.

10. The axle housing assembly according to claim 1, wherein the lower connector is a platelike connector and disposed between the first axle housing and the second axle housing.

11. The axle housing assembly according to claim 10, wherein the lower connector is disposed between a central area of a lower part of the first axle housing and a central area of a lower part of the second axle housing.

12. A vehicle comprising an axle housing assembly, the axle housing assembly further comprising:
    a first axle housing;
    a second axle housing spaced apart from the first axle housing in a front-rear direction;
    an upper connector defining a front end connected to the first axle housing and a rear end connected to the second axle housing;
    a lower connector disposed below the upper connector and defining a front end connected the first axle housing and a rear end connected to the second axle housing; and
    a mounting base connected between the upper connector and the first axle housing,
    wherein the mounting base comprises a lower part connected to a central area of an upper surface of the first axle housing, and an upper part connected to the front end of the upper connector, wherein the rear end of the upper connector is connected to a central area of an upper surface of the second axle housing.

13. The vehicle according to claim 12, wherein the first axle housing and the second axle housing are substantially same in structure.

14. The vehicle according to claim 12, wherein the upper connector and the second axle housing are connected to each other via a screw.

15. The vehicle according to claim 12, wherein the lower connector and the first axle housing are connected to each other via a screw.

16. The vehicle according to claim 12, wherein the lower connector and the second axle housing are connected to each other via a screw.

17. The vehicle according to claim 12, wherein the lower connector is a platelike connector and disposed between the first axle housing and the second axle housing.

* * * * *